(12) United States Patent
Jopling

(10) Patent No.: US 9,594,375 B2
(45) Date of Patent: Mar. 14, 2017

(54) HEADING CONTROL USING MULTIPLE AUTOPILOTS

(71) Applicant: Navico Holding AS, Egersund (NO)

(72) Inventor: Kenton Sterling Jopling, Jenks, OK (US)

(73) Assignee: NAVICO HOLDING AS, Egersund (NO)

( * ) Notice: Subject to any disclaimer, the term of this patent is extended or adjusted under 35 U.S.C. 154(b) by 0 days.

(21) Appl. No.: 14/712,632

(22) Filed: May 14, 2015

(65) Prior Publication Data

US 2016/0334792 A1    Nov. 17, 2016

(51) Int. Cl.
G05D 1/02          (2006.01)
B63H 20/00        (2006.01)

(52) U.S. Cl.
CPC ........... *G05D 1/0206* (2013.01); *B63H 20/00* (2013.01); *B63H 20/007* (2013.01); *B63H 2020/003* (2013.01)

(58) Field of Classification Search
CPC .... G05D 1/0206; B63H 20/00; B63H 20/007; B63H 2020/003
USPC .......................................................... 701/21
See application file for complete search history.

(56) References Cited

U.S. PATENT DOCUMENTS

| | | | |
|---|---|---|---|
| 1,982,702 A | 12/1934 | Sperry, Jr. | |
| 5,034,895 A * | 7/1991 | Johnson | G05D 1/0206 114/144 RE |
| 5,172,324 A * | 12/1992 | Knight | G05D 1/0206 114/144 E |
| 5,202,835 A * | 4/1993 | Knight | G05D 1/0206 114/144 E |
| 5,362,263 A | 11/1994 | Petty | |
| 5,491,636 A * | 2/1996 | Robertson | B63H 25/42 114/144 B |
| 5,509,369 A * | 4/1996 | Ford | B63H 21/265 114/150 |

(Continued)

FOREIGN PATENT DOCUMENTS

| | | | |
|---|---|---|---|
| GB | 2424967 B | | 2/2008 |
| KR | 20140016782 A | * | 2/2014 |
| KR | 101383293 B1 | * | 4/2014 |

*Primary Examiner* — Calvin Cheung
*Assistant Examiner* — Angelina Shudy
(74) *Attorney, Agent, or Firm* — Nelson Mullins Riley & Scarborough LLP

(57) ABSTRACT

Various implementations described herein are directed to a non-transitory computer readable medium having stored thereon a plurality of computer-executable instructions which, when executed by a computer, cause the computer to: receive a selection of a desired location or desired bearing for a watercraft, receive a desired heading for the watercraft, determine a first set of instructions for a first autopilot corresponding to the desired location or desired bearing and the desired heading, determine a second set of instructions for a second autopilot corresponding to the desired location or desired bearing and the desired heading, transmit the first set of instructions to the first autopilot and the second set of instructions to the second autopilot. The first set of instructions and the second set of instructions cause the first autopilot and the second autopilot to navigate the watercraft to the desired location or on the desired bearing while maintaining the desired heading.

20 Claims, 7 Drawing Sheets

(56) References Cited

U.S. PATENT DOCUMENTS

| | | | | |
|---|---|---|---|---|
| 5,523,951 A * | 6/1996 | Kriesgman | G05D 1/0875 | |
| | | | 318/588 | |
| 5,632,217 A | 5/1997 | Ford et al. | | |
| 5,785,281 A | 7/1998 | Peter et al. | | |
| 5,809,457 A * | 9/1998 | Yee | G01S 19/53 | |
| | | | 701/472 | |
| 6,230,642 B1 * | 5/2001 | McKenney | B63H 25/02 | |
| | | | 114/144 R | |
| 6,273,771 B1 * | 8/2001 | Buckley | B63H 21/213 | |
| | | | 114/144 RE | |
| 6,311,634 B1 | 11/2001 | Ford et al. | | |
| 6,431,923 B1 * | 8/2002 | Knight | B63H 20/007 | |
| | | | 440/6 | |
| 6,459,372 B1 * | 10/2002 | Branham | A01K 97/00 | |
| | | | 340/539.1 | |
| 6,611,737 B1 | 8/2003 | El-Tahan et al. | | |
| 6,687,579 B2 * | 2/2004 | Thompson | G05D 1/0206 | |
| | | | 114/162 | |
| 6,696,980 B1 | 2/2004 | Langner et al. | | |
| 6,803,860 B1 | 10/2004 | Langner et al. | | |
| 6,832,138 B1 | 12/2004 | Straub et al. | | |
| 6,842,122 B1 | 1/2005 | Langner et al. | | |
| 6,867,711 B1 | 3/2005 | Langner et al. | | |
| 6,909,946 B1 | 6/2005 | Kabel et al. | | |
| 6,946,976 B1 | 9/2005 | Langner et al. | | |
| 7,004,803 B2 * | 2/2006 | Ruffe | B63H 5/125 | |
| | | | 440/53 | |
| 7,127,333 B2 * | 10/2006 | Arvidsson | G05D 1/0016 | |
| | | | 701/2 | |
| 7,200,488 B2 * | 4/2007 | Taboada | A01K 79/00 | |
| | | | 342/357.31 | |
| 7,254,483 B2 * | 8/2007 | Squires | G06Q 10/10 | |
| | | | 702/2 | |
| 7,404,369 B2 * | 7/2008 | Tracht | B63B 39/061 | |
| | | | 114/144 RE | |
| 7,769,932 B2 * | 8/2010 | Nichols | H04J 3/0641 | |
| | | | 326/26 | |
| 8,156,882 B2 * | 4/2012 | Ito | B63H 20/12 | |
| | | | 114/144 RE | |
| 8,180,503 B2 | 5/2012 | Estabrook et al. | | |
| 8,195,346 B1 | 6/2012 | Duerksen et al. | | |
| 8,209,069 B1 | 6/2012 | McLoughlin et al. | | |
| 8,265,812 B2 * | 9/2012 | Pease | B63H 25/04 | |
| | | | 701/10 | |
| 8,346,395 B2 * | 1/2013 | Rosen | H04L 12/40013 | |
| | | | 114/144 RE | |
| 8,589,027 B2 | 11/2013 | Hosokawa | | |
| 8,626,365 B2 * | 1/2014 | Shimo | B63H 25/04 | |
| | | | 114/144 RE | |
| 8,731,748 B2 * | 5/2014 | Haymart | G01C 21/00 | |
| | | | 701/21 | |
| 8,761,976 B2 * | 6/2014 | Salmon | B63H 21/21 | |
| | | | 440/6 | |
| 8,992,274 B1 * | 3/2015 | Ward | B63H 21/20 | |
| | | | 440/1 | |
| 9,039,468 B1 * | 5/2015 | Arbuckle | B63H 21/213 | |
| | | | 440/1 | |
| 9,248,898 B1 * | 2/2016 | Kirchhoff | B63H 21/213 | |
| 9,359,057 B1 * | 6/2016 | Andrasko | B63H 20/12 | |
| 9,377,780 B1 | 6/2016 | Arbuckle et al. | | |
| 2003/0028294 A1 * | 2/2003 | Yanagi | G01S 7/22 | |
| | | | 701/21 | |
| 2003/0045975 A1 | 3/2003 | Thompson et al. | | |
| 2004/0181322 A1 * | 9/2004 | Okuyama | B63H 25/04 | |
| | | | 701/21 | |
| 2005/0252764 A1 * | 11/2005 | Meller | B63B 35/44 | |
| | | | 204/242 | |
| 2005/0263058 A1 * | 12/2005 | Suemori | B63H 21/22 | |
| | | | 114/144 R | |
| 2006/0089794 A1 * | 4/2006 | DePasqua | G01C 21/203 | |
| | | | 701/532 | |
| 2006/0293806 A1 * | 12/2006 | Basilico | G01C 21/00 | |
| | | | 701/21 | |
| 2007/0143090 A1 | 6/2007 | Skjetne et al. | | |
| 2007/0162207 A1 | 7/2007 | Shimo et al. | | |
| 2007/0178779 A1 | 8/2007 | Takada et al. | | |
| 2007/0244639 A1 | 10/2007 | Butterworth et al. | | |
| 2008/0003898 A1 * | 1/2008 | Watanabe | B63H 21/213 | |
| | | | 440/84 | |
| 2008/0039988 A1 | 2/2008 | Estabrook et al. | | |
| 2008/0169779 A1 * | 7/2008 | Samek | B63H 20/007 | |
| | | | 318/588 | |
| 2008/0205191 A1 * | 8/2008 | Coste | G01V 1/42 | |
| | | | 367/15 | |
| 2009/0037040 A1 * | 2/2009 | Salmon | B63B 17/00 | |
| | | | 701/21 | |
| 2011/0169684 A1 * | 7/2011 | Margolin | G01S 5/12 | |
| | | | 342/30 | |
| 2011/0213515 A1 * | 9/2011 | Haymart | G01C 21/00 | |
| | | | 701/21 | |
| 2012/0014220 A1 * | 1/2012 | DePasqua | G01S 7/52004 | |
| | | | 367/88 | |
| 2012/0015566 A1 * | 1/2012 | Salmon | B63H 21/21 | |
| | | | 440/1 | |
| 2012/0130570 A1 | 5/2012 | Pease | | |
| 2012/0232719 A1 * | 9/2012 | Salmon | G05D 1/0206 | |
| | | | 701/2 | |
| 2013/0085630 A1 | 4/2013 | Ninomiya et al. | | |
| 2013/0110329 A1 * | 5/2013 | Kinoshita | B63B 49/00 | |
| | | | 701/21 | |
| 2014/0340241 A1 | 11/2014 | Smart, Jr. | | |
| 2015/0054732 A1 | 2/2015 | Bailey | | |
| 2015/0089427 A1 | 3/2015 | Akuzawa | | |
| 2016/0016651 A1 | 1/2016 | Anderson et al. | | |

* cited by examiner

| Autopilot Options | | |
|---|---|---|
| ANCHOR | ANCHOR OFFSET | ANCHOR SWEEP |
| HEADING LOCK | HEADING OFFSET | HEADING SWEEP |
| SAVE | NAVIGATION | SETTINGS |

Figure 6

HEADING CONTROL USING MULTIPLE AUTOPILOTS

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

A marine vessel, i.e., a watercraft, may have one or more motors that are used for propulsion or steering. Typically, the engines are gasoline, electric, or diesel engines. The motors may be operated manually or by autopilot units. An autopilot unit may control the direction and speed of the motor.

SUMMARY

Various implementations described herein are directed to a non-transitory computer readable medium having stored thereon a plurality of computer-executable instructions which, when executed by a computer, cause the computer to: receive a selection of a desired location or desired bearing for a watercraft, receive a desired heading for the watercraft, determine a first set of instructions for a first autopilot corresponding to the desired location or desired bearing and the desired heading, determine a second set of instructions for a second autopilot corresponding to the desired location or desired bearing and the desired heading, transmit the first set of instructions to the first autopilot and the second set of instructions to the second autopilot. The first set of instructions and the second set of instructions cause the first autopilot and the second autopilot to navigate the watercraft to the desired location or on the desired bearing while maintaining the desired heading.

Various implementations described herein are directed to an apparatus for displaying marine electronic data. The apparatus has one or more processors, a screen configured to display marine data and memory having a plurality of executable instructions which, when executed by the one or more processors, cause the one or more processors to: receive a selection of a desired location and a desired heading for a watercraft, determine a first set of instructions for a first autopilot corresponding to the desired location and the desired heading, determine a second set of instructions for a second autopilot corresponding to the desired location and the desired heading, and transmit the first set of instructions to the first autopilot and the second set of instructions to the second autopilot. The first set of instructions and the second set of instructions cause the first autopilot and the second autopilot to navigate the watercraft to the desired location while maintaining the desired heading.

Various implementations described herein are directed to a non-transitory computer readable medium having stored thereon a plurality of computer-executable instructions which, when executed by a computer, cause the computer to: receive a range of headings for a watercraft, receive a location of the watercraft, determine a first set of instructions for a first autopilot corresponding to the desired range of headings, determine a second set of instructions for a second autopilot corresponding to the range of headings, and transmit the first set of instructions to the first autopilot and the second set of instructions to the second autopilot. The first set of instructions and the second set of instructions cause the first autopilot and the second autopilot to maintain the location of the watercraft and rotate the watercraft through the range of headings.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 6 illustrates an autopilot configuration user interface in accordance with various implementations described herein.

DETAILED DESCRIPTION

Various implementations of using multiple autopilots for a marine vessel will now be described in more detail with reference to FIGS. 1-8.

Figure 1:
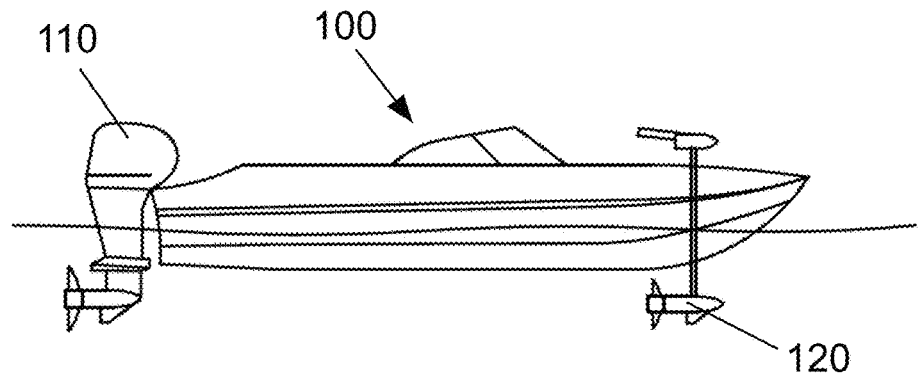
FIG. 1 illustrates a watercraft in connection with implementations of various techniques described herein.

FIG. 1 illustrates a watercraft 100 in connection with implementations of various techniques described herein. The watercraft 100 has an outboard motor 110, which may be a gasoline or diesel engine. The outboard motor 110 is attached to the transom at the stern of watercraft 100.

The watercraft 100 also has a trolling motor 120. The trolling motor 120 may be used for directional control and localized propulsion. The trolling motor 120 may be a gasoline, diesel, or electric motor. The trolling motor 120 may be quieter than the outboard motor 110. In one implementation, the trolling motor 120 is used to propel and steer the watercraft 100 while a fisherman on watercraft 100 is fishing. The trolling motor 120 is attached to the bow of the watercraft 100, but may be attached to either the bow or the stern. The trolling motor 120 may be raised out of the water when not in operation. For example, the trolling motor 120 may be raised while the outboard motor 110 is being operated to minimize drag on the watercraft 100. Although the watercraft 100 is illustrated as having an outboard motor 110 and a trolling motor 120, the watercraft 100 may use any combination of outboard motors, inboard motors, sterndrives, thrusters, jets, pods, trolling motors, or any other type of watercraft motor for propulsion.

Figure 2:
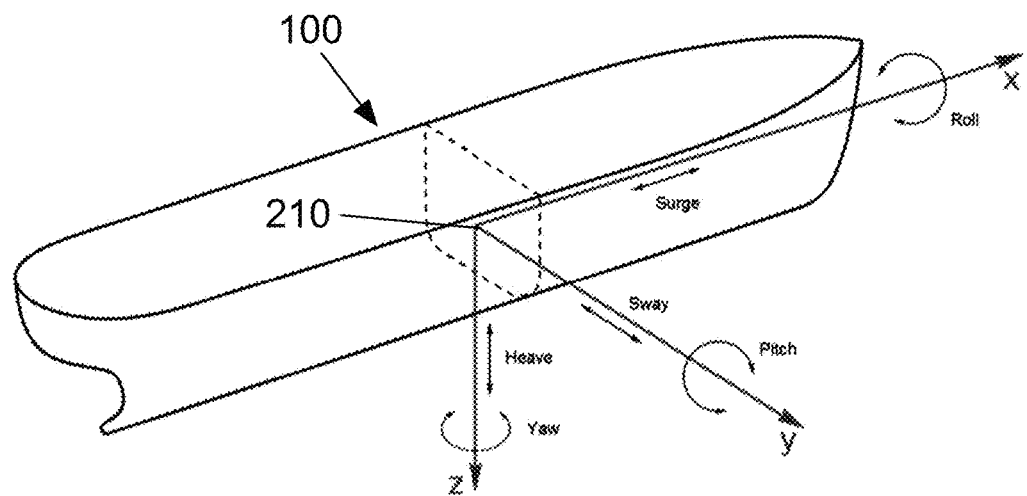
FIG. 2 illustrates the six degrees of freedom of motion of a watercraft in connection with implementations of various techniques described herein.

FIG. 2 illustrates the six degrees of freedom of motion of the watercraft 100 in connection with implementations of various techniques described herein. The watercraft 100 may move in six degrees of freedom about the watercraft's center of gravity 210. Linear motion of the watercraft 100 is defined in the z-axis as heave (up-or-down motion), in the y-axis as sway (side-to-side motion), and in the x-axis as surge (front-or-back motion). Rotational motion of the watercraft 100 is defined with respect to the z-axis as yaw (side-to-side motion of the bow), with respect to y-axis as pitch (up-or-down motion of the bow), and with respect to the x-axis as roll (side-to-side motion of the watercrafts superstructure).

Figure 3:
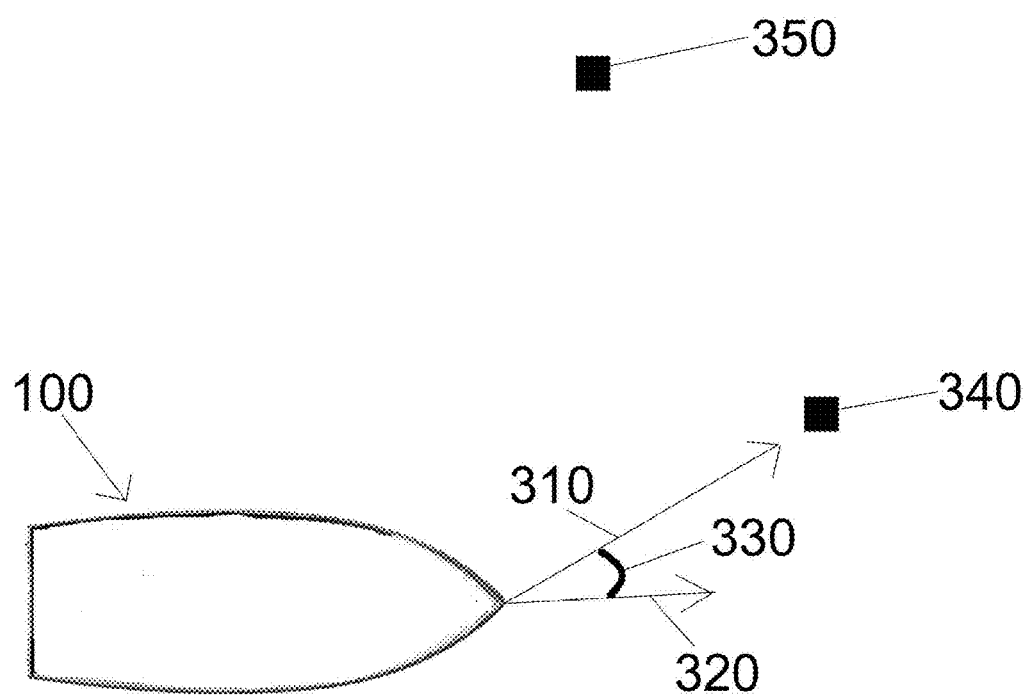
FIG. 3 illustrates a watercraft navigating to a waypoint in accordance with implementations of various techniques described herein.

FIG. 3 illustrates the watercraft 100 navigating to a waypoint 340 in accordance with implementations of various techniques described herein. The watercraft 100 is illustrated as navigating a course comprising waypoints 340 and 350. A course may comprise a series of waypoints, or coordinates, and a destination. In FIG. 3, the course comprises first navigating to the first waypoint 340 and then navigating to the second waypoint 350. A heading 320 is the direction in which the watercraft 100 is pointing. The bearing 310 of the watercraft may be a desired direction of travel of the watercraft, or a direction to a destination. In FIG. 3, the bearing 310 is the angle of a straight line vector between the current position of the watercraft 100 and the first waypoint 340. The heading and bearing may be measured in degrees.

In the absence of external forces, such as winds, waves, tides, or currents, the heading 320 and bearing 310 of the watercraft 100 may be equivalent. However, external forces may cause the watercraft 100 to travel in a different direction from the heading 320, thereby causing the bearing 310 and heading 320 to be different by an angle 330. In order to navigate to the waypoint 340 while the watercraft 100 is affected by external forces, the watercraft 100 may be steered to compensate for the external forces. This may be referred to as crabbing. For example, if the heading 320 of the watercraft is due north, i.e., 0 degrees, and the bearing of the watercraft is 10 degrees, the watercraft is drifting, or crabbing, by 10 degrees. Additionally, as described below in method 500, two or more autopilots may be used to control the heading and bearing of the watercraft.

Figure 4:
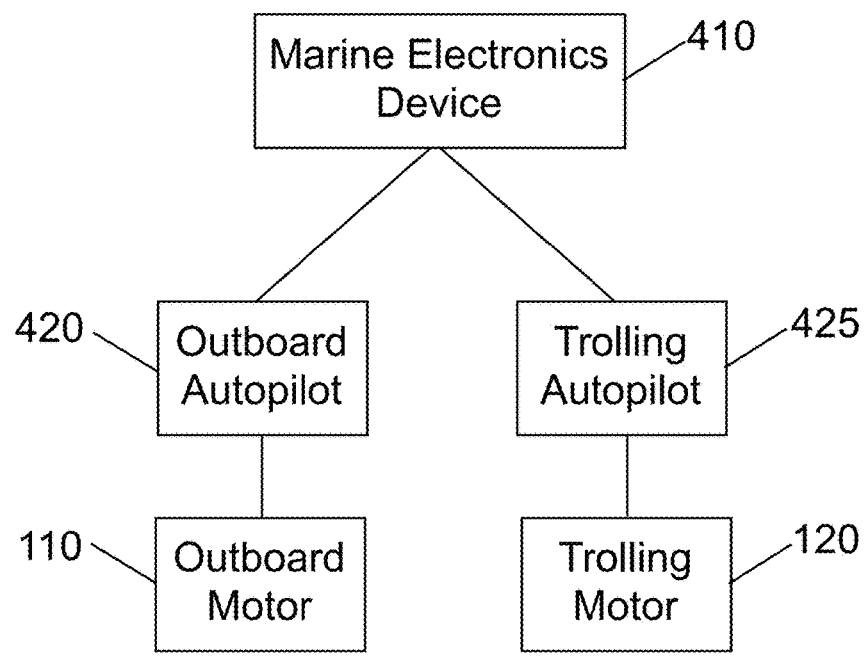
FIG. 4 illustrates a diagram of marine autopilots in accordance with implementations of various techniques described herein.

FIG. 4 illustrates a diagram 400 of marine autopilots in accordance with various implementations described herein. A marine electronics device 410, further described in FIG. 7, may be attached to or integrated in a watercraft 100. The marine electronics device 410 may be connected to electronic systems on the watercraft 100, and may be used to control the systems on the watercraft 100.

The marine electronics device 410 is connected to an outboard autopilot 420 and a trolling autopilot 425. The autopilots 420 and 425 may automatically control a motor. For example, the autopilots 420 and 425 may control the speed and direction of a motor. In another example, coordinates may be transmitted to an outboard autopilot 420, and the outboard autopilot 420 may navigate the watercraft 100 to the received coordinates. The autopilots 420 and 425 may contain or be connected to Global Positioning System (GPS) units, a compass, or other sensors used for navigating a watercraft 100. For example, the outboard autopilot 420 may receive location information from a GPS device connected to a network, such as a National Marine Electronics Association (NMEA) 2000 network.

The outboard autopilot 420 is connected to an outboard motor 110. The trolling autopilot 425 is connected to a trolling motor 120. The autopilots 420 and 425 may use hydraulic systems or cable steer systems to steer the motors 110 and 120. In one implementation, an autopilot may be integrated in a motor. For example, the trolling motor 120 may have an integrated trolling autopilot 425. Any number or type of autopilots and motors may be used on the watercraft 100.

Figure 5:
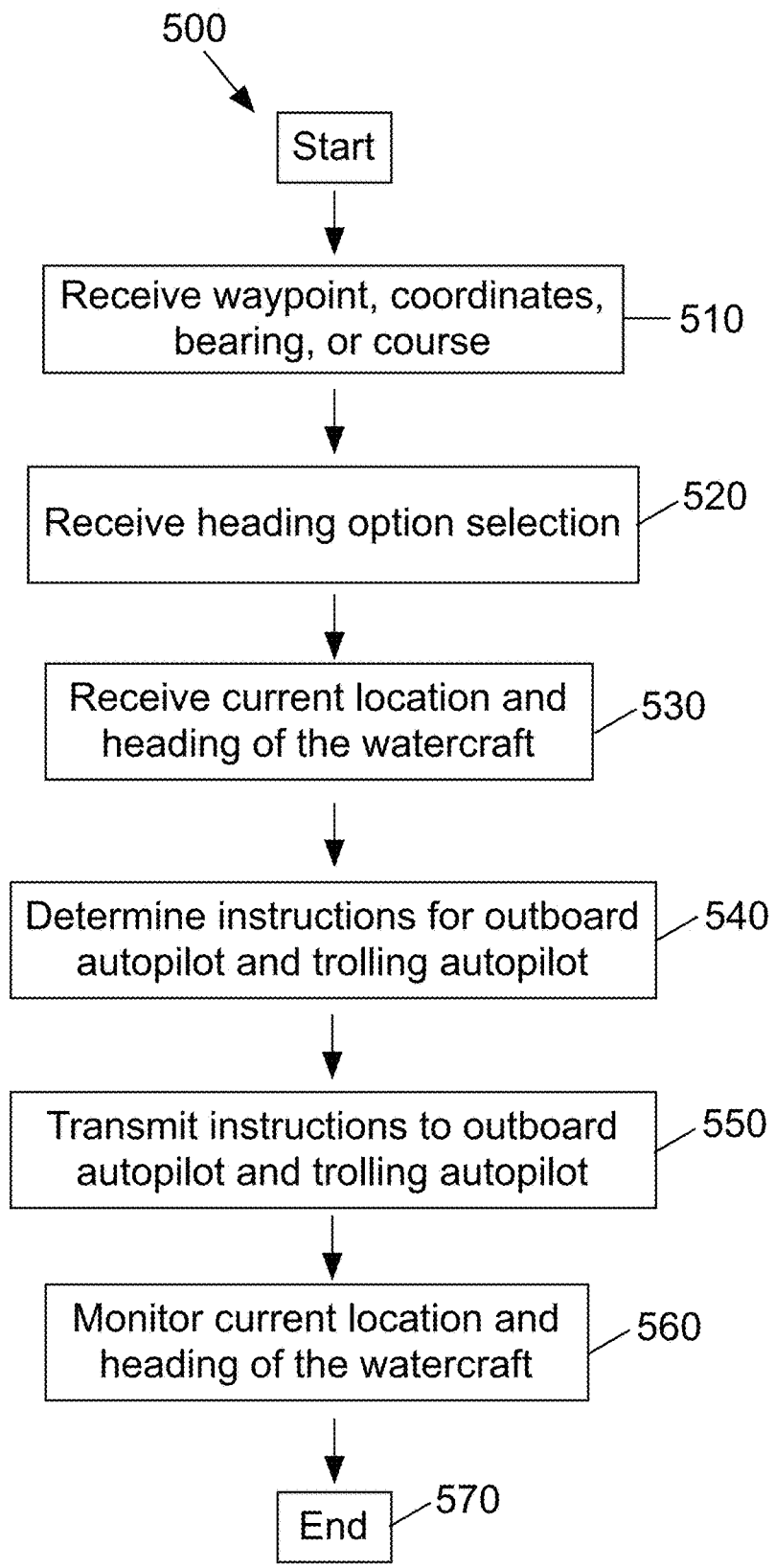
FIG. 5 illustrates a flow diagram of a method for configuring multiple autopilots in accordance with implementations of various techniques described herein.

FIG. 5 illustrates a flow diagram of a method for configuring multiple autopilots in accordance with implementations of various techniques described herein. In one implementation, method 500 may be performed by any computer system 800, including a marine electronics device 410 and the like. It should be understood that while method 500 indicates a particular order of execution of operations, in some implementations, certain portions of the operations might be executed in a different order, and on different systems. Further, in some implementations, additional operations or steps may be added to the method 500. Likewise, some operations or steps may be omitted.

Multiple autopilots may be configured by the method 500 to dynamically control a watercraft's heading while the watercraft 100 maintains a fixed position or while the watercraft 100 is moving. Further, the autopilots may be configured such that the watercraft 100 maintains a bearing, navigates to a waypoint or along a route, maintains a location, performs turns patterns, or any combination thereof.

At block 510, a selected waypoint, coordinates, bearing, or course may be received. A user may select the waypoint or coordinates as a destination for the watercraft 100. If the user wants to maintain the current position of the watercraft 100, the selected coordinates may be the current coordinates of the watercraft 100. The user may select the course as a course for the watercraft 100 to navigate. The course may be a recorded course that the watercraft 100 has previously traveled. The course may comprise a series of waypoints or coordinates.

At block 520, a heading option selection may be received. FIG. 6 illustrates a display with heading option selections. The heading option selection may be a request to maintain a selected heading, to rotate the watercraft at a selected speed, or to rotate the watercraft between two headings. These selections may be referred to as dynamic positioning.

At block 530, a current location and heading of the watercraft may be received. The location may be measured by a GPS device. The heading may be measured by a compass. Other sensor information may be received at block 530 as well. For example, time information may be received from the GPS unit. In another example, data from engine sensors may be received. The engine sensor data may describe a motor speed, rotational direction, orientation, or position of a tiller.

At block 540, a set of instructions for the outboard autopilot 420 may be determined and a set of instructions for the trolling autopilot 425 may be determined. The instructions may be a message, a command, a configuration, a set of coordinates, a heading, or any other input for controlling an autopilot. The instructions may correspond to the heading option selection received at block 520 and the waypoint, coordinates, or course received at block 510. The instructions may cause the autopilots 420 and 425 to steer the watercraft 100. The instructions may cause the autopilots 420 and 425 to move the watercraft 100 along the x or y axes illustrated in FIG. 2, while controlling the heading of the watercraft 100. For example, if the selections received at block 510 and 520 are to maintain a position and rotate the heading of the watercraft 180 degrees, the instructions may be determined for the autopilots that instruct the autopilots to rotate the watercraft 180 degrees.

The sets of instructions determined at block 540 may instruct the autopilots 420 and 425 to set a motor speed, rotational direction, or orientation. The sets of instructions may control the position of the watercraft's tiller.

The instructions may be determined based on the current location and heading of the watercraft 100 received at block 530. For example, if the user selection is an instruction to travel to a waypoint while maintaining a selected heading, the current location of the watercraft may be used to calculate the bearing for the watercraft 100, and the current heading of the watercraft may be used to calculate a yaw adjustment for the watercraft 100. In this example the calculated bearing and yaw adjustment are then used to determine the sets of instructions for the autopilots 420 and 425.

The sets of instructions determined at block 540 may cause the autopilots 420 and 425 to operate simultaneously or separately. For example, the sets of instructions may cause the outboard motor 110 to be used for propulsion and steering, and the trolling motor 120 to simultaneously be used to control the heading of the watercraft 100.

At block 550, the outboard autopilot set of instructions determined at block 540 may be transmitted to the outboard autopilot 420, and the trolling autopilot set of instructions determined at block 540 may be transmitted to the trolling autopilot 425.

The sets of instructions may be transmitted to the autopilots 420 and 425 using a wired or wireless network connection. The sets of instructions may be converted to a format compatible with the outboard autopilot 420 or trolling motor autopilot 425. The sets of instructions may be transmitted at a single time or at multiple times.

At block 560, the current location and heading of the watercraft 100 may be monitored. If the current heading of the watercraft 100 is not equivalent to or approximately equivalent to the heading received at block 520, sets of instructions may be determined at block 540 to correct the heading, and the sets of instructions may be transmitted to the autopilots 420 and 425 at block 550. The current location of the watercraft 100 may be compared to a planned or expected location of the watercraft 100, and adjustments may be made if the current location is not equivalent or approximately equivalent to the planned or expected location. For example, if a waypoint is received at block 510, and a course is calculated at block 540 to navigate the watercraft 100 to the waypoint, sets of instructions may be transmitted to the autopilots 420 and 425 if the watercraft 100 deviates from the calculated course. In another example, if a course is received at block 510, and the watercraft 100 reaches a first waypoint in the course, sets of instructions corresponding to a second waypoint in the course may be transmitted to the autopilots 420 and 425.

At block 570, the method 500 may terminate. For example, if the watercraft 100 reaches the waypoint received at block 510, the method 500 may terminate. In another example, if a user makes a selection to stop the autopilots 420 and 425, then method 500 may terminate.

Method 500 may aid in positioning a watercraft 100 when multiple fishermen are on the watercraft 100 or when multiple types of fishing are occurring on the watercraft 100. For example, method 500 may allow the fishermen to control the heading or bearing of the watercraft 100. The method 500 may be used to maintain an outboard motor 110 in deeper water relative to a shoreline.

Although method 500 is described as configuring one outboard motor autopilot 420 and one trolling motor autopilot 425, any type or combination of autopilots may be configured using method 500.

FIG. 6 illustrates a user interface 600 for configuring the outboard motor autopilot 420 and trolling motor autopilot 425 in accordance with various implementations described herein. The user interface 600 may be displayed on a marine electronics device 410, further described in FIG. 8. The user interface 600 includes buttons for selecting autopilot configuration options.

The user interface 600 may include an ANCHOR menu option to maintain the location of the watercraft 100. The user interface 600 may include an ANCHOR OFFSET menu option to maintain the location of the watercraft 100 and to maintain a set heading. For example, the ANCHOR OFFSET menu option may be used to maintain the heading of the watercraft 100 relative to a point of interest, such as a shoreline, a shoal, a reef, a sandbar, a wreck, a dock, or underwater debris.

The user interface 600 may include an ANCHOR SWEEP menu option to sweep the bow of the watercraft 100 through an arc at an anchored location. This may be referred to as yawing. After a user selects the ANCHOR SWEEP menu option, a user may enter parameters for the arc. For example, the user may select a start heading and a stop heading for the arc, i.e., an arc size, select whether the sweep is clockwise (to starboard), or counterclockwise (to port), select a duration of the sweep, select whether the sweep reverses, select whether a sweep repeats, or select a speed for the sweep. The ANCHOR SWEEP menu may also be configured to cause the vessel to stop after a predetermined number of sweeps, or remains on a predetermined position after a predetermined number of sweeps.

The user interface 600 may also include a HEADING OFFSET menu option to maintain the bow of the watercraft 100 at a selected heading while navigating a course or navigating to a waypoint. For example, a user may select a waypoint or coordinates for the watercraft 100 to navigate to, and select a heading for the watercraft 100 to maintain while traveling to the waypoint or coordinates. In another example, a user may select a bearing for the watercraft 100 and a heading for the watercraft 100 to maintain while traveling in the direction of the bearing. In yet another example, a user may select a route, a series of waypoints, or a series of coordinates for the watercraft 100 to navigate to, and a heading for the watercraft 100 to maintain while traveling. The user interface 600 may also include a HEADING LOCK menu option to maintain the existing heading of the watercraft 100 while the watercraft 100 is moving. The user interface 600 may also include a HEADING SWEEP menu option to sweep the bow of the watercraft 100 through an arc while the watercraft 100 is moving.

The user interface 600 may also include a SAVE menu option to save autopilot configurations. Using the SAVE menu option, a user may save turn patterns, docking and refueling maneuvers, or other configurations. The turn patterns may comprise a square pattern, a zig-zag pattern, a circular pattern, a figure-eight pattern, a spiral pattern, a series of loops, or any other turn pattern. For example, a user may select a figure-eight turn pattern and a heading to maintain while performing the figure-eight turn pattern. The user interface 600 may also include a NAVIGATION menu option, whereby the user may select a course for the watercraft 100 to navigate. The user interface 600 may also include a SETTINGS menu option to adjust settings or configurations for the compass, GPS unit or a gyro. For example, the user may enter their absolute location, relative location (antenna position) or orientation within the watercraft 100 as a set of coordinates or offsets with respect to a reference point within the watercraft 100. The reference point may be the centerline, the fore-and-aft line or center of gravity etc. In another example, the user may specify their location as a distance from the watercraft's bow, stern, port, starboard, or as a vertical offset. Within the SETTINGS menu the user may enter adjustments or alignments for the compass, GPS unit or gyro. For example, the user may select whether a reference direction is true or magnetic north. Further, within the SETTINGS menu the user may select a primary unit compass, GPS unit or gyro if more than one is available.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc., that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Marine Electronics Device

Figure 7:
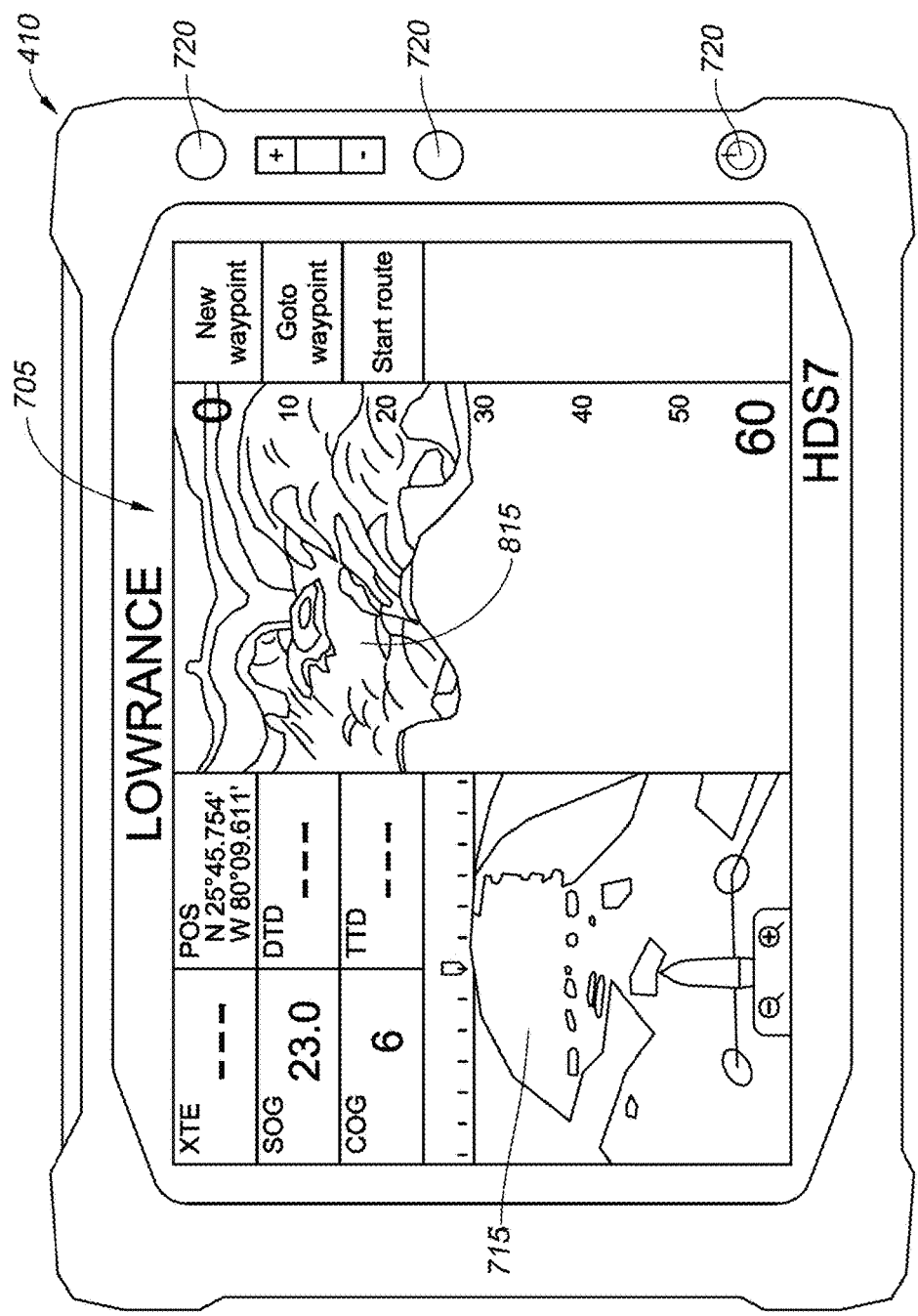
FIG. 7 illustrates a schematic of a marine electronics device in accordance with various implementations described herein.

FIG. 7 illustrates a schematic diagram of a marine electronics device 410 in accordance with various implementations described herein. The marine electronics device 410 includes a screen 705. In certain implementations, the screen 705 may be sensitive to touching by a finger. In other implementations, the screen 705 may be sensitive to the body heat from the finger, a stylus, or responsive to a mouse. The marine electronics device 410 may be attached to a National Marine Electronics Association (NMEA) bus or network. The marine electronics device 410 may send or receive data to or from another device attached to the NMEA 2000 bus. For example, the marine electronics device 410 may transmit commands and receive data from a motor or a sensor using an NMEA 2000 bus. The marine electronics device 410 may transmit or receive NMEA 2000 compliant messages, messages in a proprietary format that do not interfere with NMEA 2000 compliant messages or devices, or messages in any other format. The device 410 may display marine electronic data 715. The marine electronic data types 715 may include chart data, radar data, sonar data, steering data, dashboard data, navigation data, fishing data, and the like. The marine electronics device 410 may also include a plurality of buttons 720, which may be either physical buttons or virtual buttons, or a combination thereof. The marine electronics device 410 may receive input through a screen 705 sensitive to touch or buttons 720.

Computing System

Figure 8:
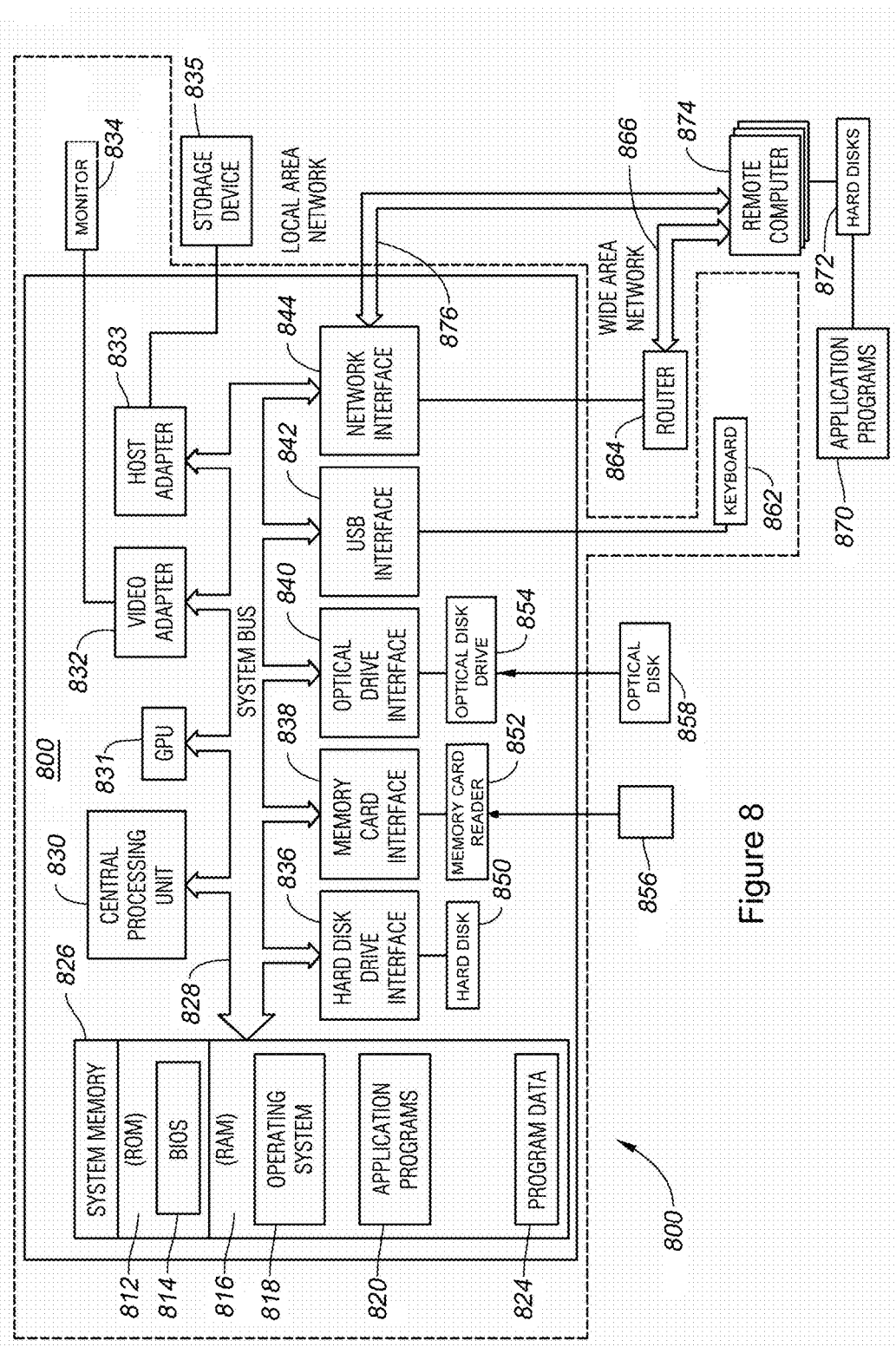
FIG. 8 illustrates a schematic diagram of a computing system in which the various technologies described herein may be incorporated and practiced.

FIG. 8 illustrates a computer system 800 into which implementations of various technologies and techniques described herein may be implemented. Computing system 800 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

The computing system 800 may include a central processing unit (CPU) 830, a system memory 826 and a system bus 828 that couples various system components including the system memory 826 to the CPU 830. Although only one CPU 830 is illustrated in FIG. 8, it should be understood that in some implementations the computing system 800 may include more than one CPU 830.

The CPU 830 can include a microprocessor, a microcontroller, a processor, a programmable integrated circuit, or a combination thereof. The CPU 830 can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU 830 may also include a proprietary processor. The CPU may include a multi-core processor.

The CPU 830 may provide output data to a Graphics Processing Unit (GPU) 831. The GPU 831 may generate graphical user interfaces that present the output data. The GPU 831 may also provide objects, such as menus, in the graphical user interface. A user may provide inputs by interacting with the objects. The GPU 831 may receive the inputs from interaction with the objects and provide the inputs to the CPU 830. In one implementation, the CPU 830 may perform the tasks of the GPU 831. A video adapter 832 may be provided to convert graphical data into signals for a monitor 834, which may also be referred to as a screen. The monitor 834 can be sensitive to heat or touching (now collectively referred to as a "touch screen"). In one implementation, the computer system 800 may not include a monitor 834.

The GPU 831 may be a microprocessor specifically designed to manipulate and implement computer graphics. The CPU 830 may offload work to the GPU 831. The GPU 831 may have its own graphics memory, and/or may have access to a portion of the system memory 826. As with the CPU 830, the GPU 831 may include one or more processing units, and each processing unit may include one or more cores.

The system bus 828 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 826 may include a read only memory (ROM) 812 and a random access memory (RAM) 816. A basic input/output system (BIOS) 814, containing the basic routines that help transfer information between elements within the computing system 800, such as during start-up, may be stored in the ROM 812. The computing system may be implemented using a printed circuit board containing various components including processing units, data storage memory, and connectors.

Certain implementations may be configured to be connected to a GPS or a sonar system. The GPS or sonar system may be connected via the network interface 844 or Universal Serial Bus (USB) interface 842. In one implementation, the computing system 800, the monitor 834, the screen 805 and buttons may be integrated into a console.

The computing system 800 may further include a hard disk drive 836 for reading from and writing to a hard disk 850, a memory card reader 852 for reading from and writing to a removable memory card 856 and an optical disk drive 854 for reading from and writing to a removable optical disk 858, such as a CD ROM, DVD ROM or other optical media. The hard disk drive 850, the memory card reader 852 and the optical disk drive 854 may be connected to the system bus 828 by a hard disk drive interface 836, a memory card interface 838 and an optical drive interface 840, respectively. The drives and their associated computer-readable media may provide nonvolatile storage of computer-readable instructions, data structures, program modules and other data for the computing system 800.

Although the computing system 800 is described herein as having a hard disk 850, a removable memory card 856 and a removable optical disk 858, it should be appreciated by those skilled in the art that the computing system 800 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 800. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. The computing system 800 may also include a host adapter 833 that connects to a storage device 835 via a small computer system interface (SCSI) bus, a Fiber Channel bus, an eSATA bus, or using any other applicable computer bus interface. The computing system 800 can also be connected to a router 864 to establish a wide area network (WAN) 866 with one or more remote computers 874. The router 864 may be connected to the system bus 828 via a network interface 844. The remote computers 874 can also include hard disks 872 that store application programs 870.

In another implementation, the computing system 800 may also connect to one or more remote computers 874 via local area network (LAN) 876 or the WAN 866. When using a LAN networking environment, the computing system 800 may be connected to the LAN 876 through the network interface or adapter 844. The LAN 876 may be implemented via a wired connection or a wireless connection. The LAN 876 may be implemented using Wi-Fi technology, cellular technology, or any other implementation known to those skilled in the art. The network interface 844 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 874. It will be appreciated that the network connections shown are exemplary and other means of establishing a communications link between the computer systems may be used. The network interface 844 may also include digital cellular networks, Bluetooth, or any other wireless network interface.

A number of program modules may be stored on the hard disk 850, memory card 856, optical disk 858, ROM 812 or RAM 816, including an operating system 818, one or more application programs 820, program data 824 and a database system. The one or more application programs 820 may contain program instructions configured to perform method 500 according to various implementations described herein. The operating system 818 may be any suitable operating system that may control the operation of a networked personal or server computer, such as Windows® XP, Mac OS® X, Unix-variants (e.g., Linux® and BSD®), Android®, iOS®, and the like.

A user may enter commands and information into the computing system 800 through input devices such as a keyboard 862 and pointing device. Other input devices may include a microphone, joystick, game pad, satellite dish, scanner, user input button, wearable device, or the like. These and other input devices may be connected to the CPU 830 through a USB interface 842 coupled to system bus 828, but may be connected by other interfaces, such as a parallel port, Bluetooth or a game port. A monitor 805 or other type of display device may also be connected to system bus 828 via an interface, such as a video adapter 832. In addition to the monitor 834, the computing system 800 may further include other peripheral output devices such as speakers and printers.

It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference has been made in detail to various implementations, examples of which are illustrated in the accompanying drawings and figures. In the detailed description, numerous specific details are set forth in order to provide a thorough understanding of the present disclosure. However, it should be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc., may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It should also be understood that the term "and/or" as used herein refers to and encompasses any and all possible combinations of one or more of the associated listed items. It should be further understood that the terms "includes," "including," "comprises" and/or "comprising," when used in this specification, specify the presence of stated features, integers, steps, operations, elements, and/or components, but should not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" should not be construed to only pertain to situations where the number of choices involved is exactly two, but rather refers to another possibility among many other possibilities.

Additionally, various technologies and techniques described herein include receiving user requests for a number of different operations. In certain instances, the user request for a particular operation will be explicitly described. It should be understood that a "request" or "can request" can also include, but are not limited to, touching a screen, double tapping a screen (tapping the screen twice in rapid succession), pressing a particular physical or virtual button, making a selection from a menu, swiping the screen (placing a finger towards an edge of the screen and traversing the screen while maintaining contact between the finger and the screen) placement of a cursor at a particular location, stylus pointing, mouse selection, an audible command, as well as the explicit description of the "request" for the particular operations.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer readable medium having stored thereon a plurality of computer-executable instructions which, when executed by a computer, cause the computer to:
receive a selection of a desired location for a watercraft;
receive a desired heading for the watercraft;
determine a first set of instructions for a first autopilot that is connected to a first motor, the first autopilot being configured to automatically control the first motor at a first speed and a first direction, wherein the first set of instructions corresponds to the first speed and the first direction required to navigate the watercraft on a first heading;
determine a second set of instructions for a second autopilot that is connected to a second motor, the second autopilot being configured to automatically control the second motor at a second speed and a second direction, wherein the second set of instructions corresponds to the second speed and the second direction required to navigate the watercraft on a second heading, and wherein the second set of instructions is different from the first set of instructions;
transmit the first set of instructions to the first autopilot; and
transmit the second set of instructions to the second autopilot;
wherein the first set of instructions and the second set of instructions cause the first autopilot and the second autopilot to navigate the watercraft to the desired location while maintaining the desired heading.

2. The non-transitory computer readable medium of claim 1, wherein the computer is further caused to:
monitor a current heading of the watercraft; and
transmit additional, respective sets of instructions to the first autopilot and the second autopilot to simultaneously operate to maintain the desired heading.

3. The non-transitory computer readable medium of claim 1, wherein the heading is defined relative to a stationary point of interest.

4. The non-transitory computer readable medium of claim 1, wherein the first autopilot comprises an outboard motor autopilot and the second autopilot comprises a trolling motor autopilot.

5. The non-transitory computer readable medium of claim 1, wherein the first set of instructions or the second set of instructions causes the first autopilot or the second autopilot to determine a steering movement, motor speed, motor rotational direction or motor orientation.

6. The non-transitory computer readable medium of claim 1, wherein the computer-executable instructions further cause the computer to receive a selection of a turn pattern for the watercraft, and wherein the first set of instructions and the second set of instructions correspond to the turn pattern.

7. The non-transitory computer readable medium of claim 6, wherein the turn pattern comprises a square pattern, a zig-zag pattern, a circular pattern, a figure-eight pattern, a spiral pattern or a series of loops.

8. An apparatus for displaying marine electronic data, the apparatus comprising:
one or more processors;
a screen configured to display marine data; and
memory having a plurality of executable instructions which, when executed by the one or more processors, cause the one or more processors to:
receive a selection of a desired location and a desired heading for a watercraft;
determine a first set of instructions for a first autopilot that is connected to a first motor, the first autopilot being configured to automatically control the first motor at a first speed and a first direction, wherein the first set of instructions corresponds to the first speed and the first direction needed to navigate the watercraft on a first heading;
determine a second set of instructions for a second autopilot that is connected to a second motor, the second autopilot being configured to automatically control the second motor at a second speed and a second direction, wherein the second set of instructions corresponds to the second speed and the second direction needed to navigate the watercraft on a second heading, and wherein the second set of instructions is different from the first set of instructions;
transmit the first set of instructions to the first autopilot; and
transmit the second set of instructions to the second autopilot;
wherein the first set of instructions and the second set of instructions cause the first autopilot and the second autopilot to navigate the watercraft to the desired location while maintaining the desired heading.

9. The apparatus of claim 8, wherein the screen is a touchscreen and the touchscreen is configured to receive a selection of one or more headings, locations, waypoints, turn patterns, docking maneuvers, arcs, and speeds, and bearings.

10. The apparatus of claim 8, wherein the screen is a touchscreen and the touchscreen is configured to receive a selection of an arc size, sweep duration or sweep direction for the watercraft.

11. The apparatus of claim 10, wherein the touchscreen is further configured to receive a selection of whether a sweep reverses or repeats, or stops after a predetermined number of turns, or remains on a predetermined position after a predetermined number of sweeps.

12. The apparatus of claim 8, wherein the first autopilot and the second autopilot are connected to the apparatus by a wired or wireless network connection.

13. The apparatus of claim 8, wherein the one or more processors are further caused to:
monitor a current heading of the watercraft; and
transmit additional, respective sets of instructions to the first autopilot and the second autopilot to simultaneously operate to maintain the desired heading.

14. The apparatus of claim 8, wherein the first autopilot comprises an outboard motor autopilot and wherein the second autopilot comprises a trolling motor autopilot.

15. The apparatus of claim 8, wherein the first set of instructions comprises a first calculated heading and the second set of instructions comprises a second calculated heading.

16. A non-transitory computer readable medium having stored thereon a plurality of computer-executable instructions which, when executed by a computer, cause the computer to:
receive a desired range of headings for a watercraft;
receive a location of the watercraft;
determine a first set of instructions for a first autopilot that is connected to a first motor, the first autopilot being configured to automatically control the first motor at a first speed and a first direction, wherein the first set of instructions corresponds to the first speed and the first direction required to navigate the watercraft within a first range of headings;
determine a second set of instructions for a second autopilot that is connected to a second motor, the second autopilot being configured to automatically control the second motor at a second speed and a second direction, wherein the second set of instructions corresponds to the second speed and the second direction required to navigate the watercraft within a second range of headings, and wherein the second set of instructions is different from the first set of instructions;
transmit the first set of instructions to the first autopilot; and
transmit the second set of instructions to the second autopilot;
wherein the first set of instructions and the second set of instructions cause the first autopilot and the second autopilot to maintain the location of the watercraft and rotate the watercraft through the desired range of headings.

17. The non-transitory computer readable medium of claim 16, wherein the computer is further caused to:
monitor a current heading of the watercraft; and
transmit additional, respective sets of instructions to the first autopilot and the second autopilot to simultaneously operate to maintain the rotation of the watercraft through the desired range of headings.

18. The non-transitory computer readable medium of claim 16, wherein the first set of instructions comprises a first calculated heading and the second set of instructions comprises a second calculated heading.

19. The non-transitory computer readable medium of claim 16, wherein the first set of instructions or the second set of instructions causes the first autopilot or the second autopilot to determine a steering movement, motor speed, motor rotational direction or motor orientation.

20. The non-transitory computer readable medium of claim 16, wherein the range of headings comprises an arc size, sweep duration, or sweep direction for the watercraft.

* * * * *

UNITED STATES PATENT AND TRADEMARK OFFICE
CERTIFICATE OF CORRECTION

| | | |
|---|---|---|
| PATENT NO. | : 9,594,375 B2 | |
| APPLICATION NO. | : 14/712632 | |
| DATED | : March 14, 2017 | |
| INVENTOR(S) | : Kenton Sterling Jopling | |

It is certified that error appears in the above-identified patent and that said Letters Patent is hereby corrected as shown below:

In the Claims

Claim 9, Column 13, Line 42 "patterns, docking maneuvers, arcs, and speeds, and bearings." should read --patterns, docking maneuvers, arcs, and speeds.--

Signed and Sealed this
Ninth Day of May, 2017

Michelle K. Lee
*Director of the United States Patent and Trademark Office*